Aug. 7, 1923.

L. K. SCOTFORD 1,463,975

CLUTCH

Filed Aug. 6, 1921

2 Sheets-Sheet 1

Witness:
A. J. Sauser

Inventor:
Louis K. Scotford,
By Wilkinson, Huxley, Byron & Knight
Attys.

Aug. 7, 1923. 1,463,975
L. K. SCOTFORD
CLUTCH
Filed Aug. 6, 1921 2 Sheets-Sheet 2
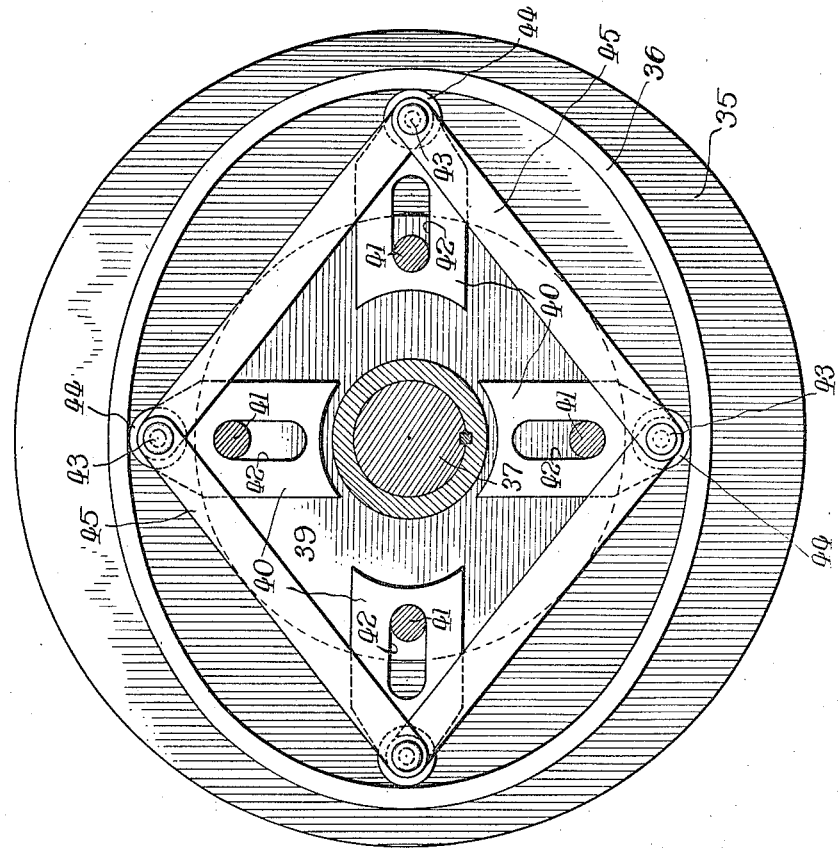
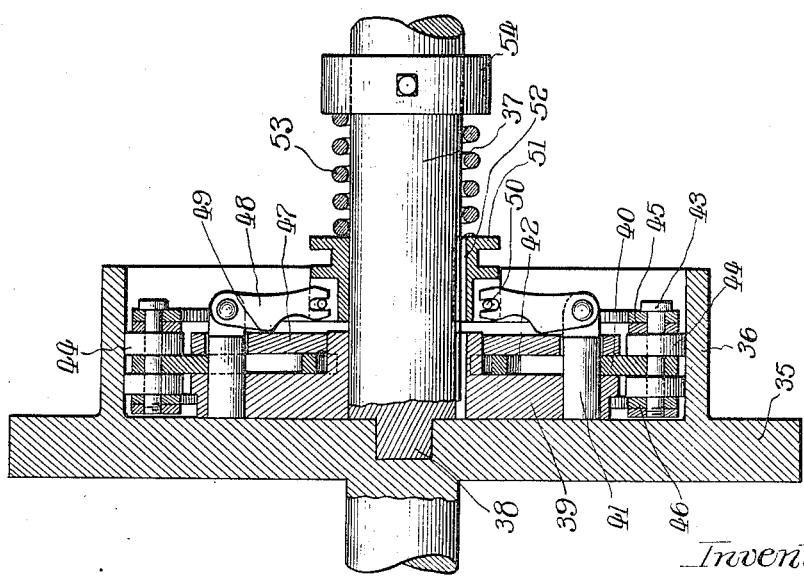
Inventor:
Louis K. Scotford, Patented Aug. 7, 1923.

1,463,975

UNITED STATES PATENT OFFICE.

LOUIS K. SCOTFORD, OF CHICAGO, ILLINOIS; MARTHA W. SCOTFORD EXECUTRIX OF SAID LOUIS K. SCOTFORD, DECEASED.

CLUTCH.

Application filed August 6, 1921. Serial No. 490,305.

*To all whom it may concern:*

Be it known that I, LOUIS K. SCOTFORD, a citizen of the United States, residing at Chicago, in the county of Cook and State of Illinois, have invented certain new and useful Improvements in Clutches, of which the following is a specification.

This invention relates to a new and improved clutch and more particularly to a clutch mechanism which operates through a positive connection between the driving and driven members.

Certain clutches have heretofore been made in which the driving member carries an eccentric cam surface, this surface being engaged by pistons carried by the driven member. In some of these devices, the pistons have been fluid operated and controlled. On such devices outwardly moving pistons are forced out by the pressure, imparted to the fluid by inwardly moving pistons. This use of the fluid entails likelihood of leakage and loss of pressure. Where fluid leaks out, the pistons will not be fully pushed outwardly and play between the pistons and cam surface will result. This play causes noise and wear.

It is an object of the present invention to provide a clutch of this general character in which the movable elements are positively connected so that they may be uniformly maintained in contact with the cam surface.

It is an additional object to provide a device in which the movable elements may be gradually locked relative to their carrying members.

It is a further object to provide a device in which the movable elements are positively locked when desired. It is also an object to provide a device which is simple in design and construction and easy of operation. Other and further objects will appear as the description proceeds.

Broadly, my invention comprises the provision of a rotatable member, having an elliptical cam surface thereon. A second rotatable member is inclosed within the cam surface and carries a plurality of radially movable elements which are rigidly interconnected. The ends of these elements engage the elliptical cam surface. Means are provided whereby the radially movable elements may be locked against such movement. In one form of the device this locking is accomplished by means of a fluid and valve means therefor. In another form of the device this locking is accomplished by frictional clamping means.

Figure 1:
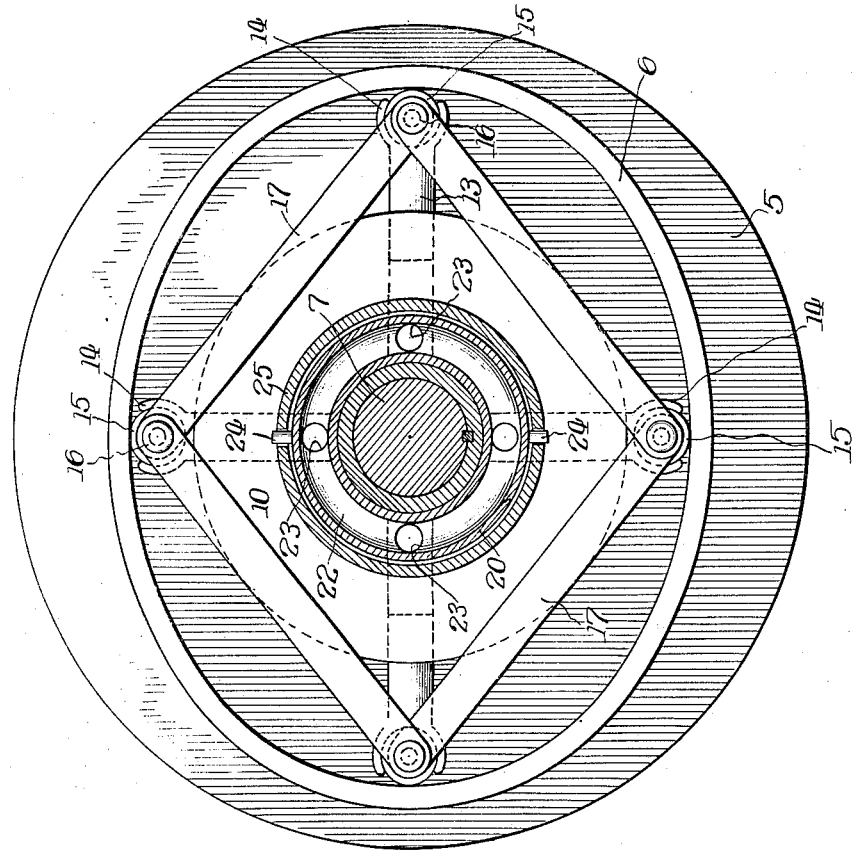
Figure 2:
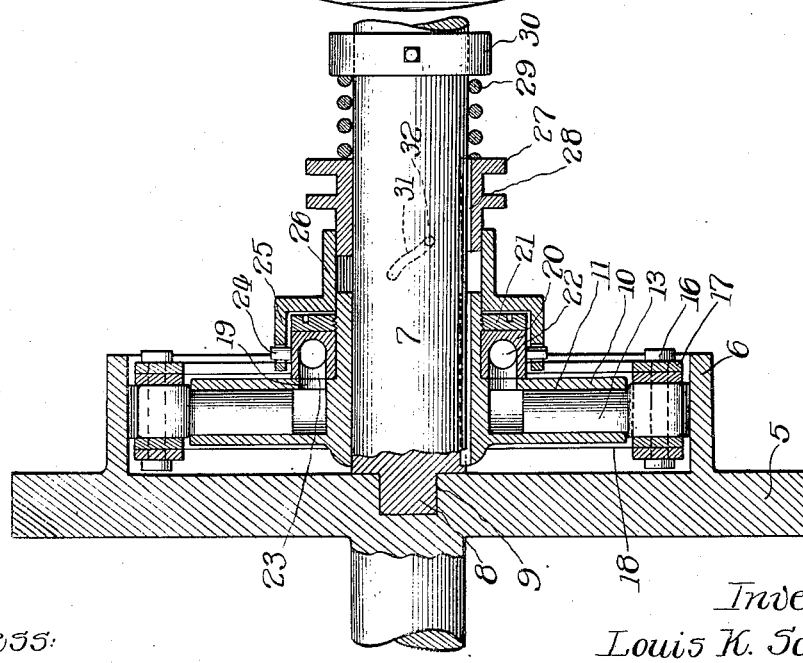

I have illustrated certain preferred embodiments of my invention in the accompanying drawing, in which Figure 1 is a face view of one form of my clutch, Figure 2 is a longitudinal section of the device of Figure 1.

Figure 3 is a view similar to Figure 1, showing a modified form of the device, and Figure 4 is a longitudinal section of the device of Figure 3.

Referring now to the form of device shown in Figures 1 and 2; the driving rotatable member 5, which may be the fly wheel of an internal combustion engine, is provided with the elliptical cam surface 6. The driven shaft 7 is in line with the driving shaft and is so maintained by the projection 8 fitting in the recess 9 in the fly wheel 5. This shaft 7 has keyed thereto the disc 10, this disc 10 having formed therein four radial bores 11. Fitted into the bores 11, are the pistons 13, these pistons being provided with the bifurcated ends 14 which receive the rollers 15, the latter engaging the cam surface 6. Each of these rollers carries a pin 16, upon which are pivoted the links 17 and links 18 above and below the member 10 respectively as seen in Figure 1. These links extend between adjacent pins 16.

The bores 11 are each connected to a port 19 extending through the upper surface of the member 10. The rotatable member 20 is carried upon the upper surface of the member 10 and is held in place by the ring 21. This member has an annular opening 22 therein, which is provided with four axial ports adapted to be brought into registration with the openings 19. The member 20 has extended therefrom the radial studs 24, these studs being engaged by arms 25 of the member 26, which member 26 is rotatable relative to the shaft 7. The operating sleeve 27 is carried by the shaft 7 and is free to move axially of the shaft. It is prevented from circumferential movement by the key 28. The spring 29 surrounds the shaft 7, one end thereof bearing against the member 27 and the opposite against the fixed collar 30. The operating sleeve 27 has secured thereto the stud 32 which coacts with the cam slot 31 formed in the member 26.

Referring now to the form of device shown in Figures 3 and 4; the fly wheel or equivalent member 35, is provided with a cam surface 36. The driven shaft 37 is maintained concentric with the fly wheel 35, by the projection 38. The driven disc 39 is keyed to the shaft 37, and four friction elements 40 are carried by the disc, being guided in recesses therein. The studs 41 are carried by the disc and extend through slots 42 in the members 40, the engagement of these slots with the pins serving to limit the radial movement of the members.

The pin 43 is carried by the outer end of each member 40, these pins 43 carrying the rollers 44 which engage the cam surface 36. These pins further have pivotally associated therewith, the links 45 and 46, which links connect the pins carried by adjacent members 40. These links are of such length as to maintain the rollers 44 in contact with the cam surface 36. The friction plate 47 is fitted above the members 40 and the upper ends of the studs 41 fit loosely through openings in the plate. The cam levers 48 are pivoted at the upper end of the studs 41 above the plate 47, these members 48 having cam portions 49 engaging the upper surface of the plate. The inner ends of the members 48 are forked and receive the studs 50 which are carried by the operating sleeve 51. This sleeve 51 is slidable upon the shaft 37 but is prevented from rotation thereon by the key 52. The clutch operating spring 53 surrounds the shaft 37 and has one end bearing against the operating sleeve 51 and the opposite end bearing against the fixed collar 54.

In the operation of the form of the device shown in Figures 1 and 2, it is to be understood that the bores 11 are filled with oil or some other suitable liquid. This oil also fills the ports 23 and the annular channel 22. The rollers 15 are in contact with the cam surface 6 and since that surface is a perfect ellipse, the links 17 and 18 will maintain them in contact regardless of the relative rotary position of the two members.

When the shaft 7 remains stationary and the fly wheel 5 and its cam surface 6 are rotated, the plungers 13 will be moved inwardly by the cam surface and outwardly by the links 17 and 18. As they move inwardly they will force oil through the ports 19 and 23 into the channel 22. As they move outwardly they will suck oil through these ports into the bores 11 from channel 22. Two plungers are moving inwardly at the same time that the alternate two are moving outwardly, so that the oil forced out of one pair of bores will be drawn into the other pair. Thus, no heavy pressure is created.

If it is desired to prevent the radial movement of the plungers, and thus to lock the shaft 7 to the fly wheel 5, the operating sleeve 27 is permitted to move toward the fly wheel under pressure of the spring 29. This member 27 is prevented from rotation relative to the shaft 7 but the member 26 is free to rotate thereon. As the member 27 moves towards the fly wheel 5, the stud 32 carried by the member 27 forces the member 26 to rotate in the clockwise direction, as seen in Figure 2, by its engagement with the slot 31. This movement of the member 26 is transmitted to the collar 20 by the arms 25 and studs 24. The rotation of the collar 20 moves the ports 23 out of registration with the ports 19. The oil in the bores 11 is thus trapped in place and the plungers are locked against radial movement by the oil.

The contact between the cam surface 6 and the rollers 15 thus locks the two shafts together and the shaft 7 is driven by the fly wheel. To unlock the shafts, the sleeve 27 is drawn back against the spring 29. This serves to rotate the member 26 by means of the stud 32 and slot 31. This rotation again brings the ports 23 and 19 into registration and the oil may again pass from the bores 11 into the annular passage 22.

The shaft 7 may be caused to be rotated by the wheel 5 at a slower speed by moving the collar 20 so that the ports 23 only partly register with the ports 19. This serves to slow up the movement of the oil, and consequently the shaft 7 is forced to rotate, but at a speed slower than that of the fly wheel 5.

The form of the device shown in Figures 3 and 4 operates in a generally similar manner. The sliding members 40 are held outwardly by the links 45 and 46 so that the rollers 44 are maintained in contact with the cam surface 36.

When the fly wheel 35 rotates and the shaft 37 remains stationary, the slides 40 are forced inwardly and outwardly by the action of the cam surface upon the rollers, and by the action of the connecting links.

When it is desired to clamp the slides 40 so as to connect the shaft 37 to the fly wheel 35, the sleeve 51 is allowed to move towards the fly wheel 35 under the influence of the spring 53. This movement is transmitted by the studs 50 to the cam levers 48. The cam faces 49 of these levers, bear down against the clamping plate 47 and the slides 40 are clamped between the plate 47 and the disc 39. Since the slides cannot move radially, the shaft 37 is locked to the fly wheel 35 and must rotate therewith. To unlock the shaft from the fly wheel, the sleeve 51 is moved to compress the spring 53. The cam levers 48 are thereby moved so as to release the clamp plate 47 and the slides 40 may then move freely.

Obviously, if desired only a small pressure may be put upon the plate 47 so that instead of being clamped, the movement of the slides 40 will simply be frictionally retarded. In this case, the shaft 37 will be rotated, but at a slower rate of speed than the fly wheel 35.

It is my intention to cover all modifications of my device coming within the spirit and scope of the following claims.

I claim:

1. In a clutch, a rotatable member, having a continuous cam surface thereon, a second rotatable member adjacent said first member having a plurality of radially movable elements adapted to engage the cam surface and to have motion imparted thereby, rigid links connecting said elements in continuous series whereby their movement is interrelated, and means adapted selectively to maintain the elements in fixed relation to the second member whereby the two members are locked together by engagement between the elements and the cam surface and caused to rotate together.

2. In a clutch, a rotatable member having an elliptical cam surface placed symmetrically of its axis, a second member rotatable about an axis aligned with that of the first member, said second member having a plurality of radially movable elements adapted to engage the cam surface and to have motion imparted thereby upon relative rotation of the two members, rigid links connecting said elements whereby their movement is interrelated, and means adapted selectively to maintain the elements in fixed relation to the second member whereby the two members are locked together by engagement between the elements and the cam surface and caused to rotate together.

3. In a clutch, a rotatable member having an elliptical cam surface placed symmetrically of its axis, a second member rotatable about an axis aligned with that of the first member, said second member having a plurality of radially movable elements adapted to engage the cam surface and to have motion imparted thereby upon relative rotation of the two members, rigid links connecting said elements whereby their movement is interrelated, said elements moving in bores in the second member, the bores being filled with fluid and normally interconnected and means adapted to break said connection and thereby to maintain the elements in fixed relation to the second member whereby the two members are locked together by engagement between the elements and the cam surface and caused to rotate together.

4. In a clutch, a rotatable member having an elliptical cam surface, placed symmetrically of its axis, a second member rotatable about an axis aligned with that of the first member, said second member having a plurality of radially movable elements adapted to engage the cam surface and to have motion imparted thereby upon relative rotation of the two members, rigid links connecting said elements whereby their movement is interrelated, the elements moving in bores in the second member, openings leading from said bores, a ring having an annular passage therein and having openings adapted to register with the openings in the second member whereby fluid may pass between the several bores, and means adapted to move said ring so that said openings are out of registration whereby the fluid is trapped in the bores and the elements locked against movement, the engagement between the elements and the cam surface thereby causing the two members to rotate together.

5. In a clutch, a rotatable member having an elliptical cam surface, placed symmetrically of its axis, a second member rotatable about an axis aligned with that of the first member, said second member having a plurality of radially movable elements adapted to engage the cam surface and to have motion imparted thereby upon relative rotation of the two members, rigid links connecting said elements whereby their movement is interrelated, the elements moving in bores in the second member, openings leading from said bores, a ring having an annular passage therein and having openings adapted to register with the openings in the second member whereby fluid may pass between the several bores, and an axially movable member so associated with the ring as to rotate said ring so that said openings are out of registration whereby the fluid is trapped in the bores and the elements locked against movement, the engagement between the elements and the cam surface thereby causing the two members to rotate together.

Signed at Chicago, Illinois, this 29th day of July, 1921.

LOUIS K. SCOTFORD.